United States Patent
Munro et al.

(10) Patent No.: US 11,568,762 B2
(45) Date of Patent: Jan. 31, 2023

(54) LAPAROSCOPIC TRAINING SYSTEM

(71) Applicant: American Association of Gynecological Laparoscopists, Inc., Cypress, CA (US)

(72) Inventors: Malcolm Munro, Tarzana, CA (US); James Messerschmidt, Prescott Valley, AZ (US); Ted Anderson, Franklin, TN (US); Joseph Hudgens, Madison, MS (US)

(73) Assignee: AMERICAN ASSOCIATION OF GYNECOLOGICAL LAPAROSCOPISTS, INC., Cypress, CA (US)

( * ) Notice: Subject to any disclaimer, the term of this patent is extended or adjusted under 35 U.S.C. 154(b) by 412 days.

(21) Appl. No.: 16/165,034

(22) Filed: Oct. 19, 2018

(65) Prior Publication Data

US 2019/0122581 A1    Apr. 25, 2019

Related U.S. Application Data

(60) Provisional application No. 62/575,263, filed on Oct. 20, 2017.

(51) Int. Cl.
  *G09B 23/28*    (2006.01)
  *G09B 19/24*    (2006.01)

(52) U.S. Cl.
  CPC ............. *G09B 23/28* (2013.01); *G09B 19/24* (2013.01); *G09B 23/285* (2013.01)

(58) Field of Classification Search
  CPC ...... G09B 23/28; G09B 23/281; G09B 23/30; G09B 23/285
  See application file for complete search history.

(56) References Cited

U.S. PATENT DOCUMENTS

| | | |
|---|---|---|
| 3,199,225 A | 10/1965 | Robertson et al. |
| 4,907,973 A | 3/1990 | Hon |
| 5,722,836 A | 3/1998 | Younker |
| 5,800,179 A | 9/1998 | Bailey |
| 5,873,732 A | 2/1999 | Hasson |

(Continued)

FOREIGN PATENT DOCUMENTS

| | | |
|---|---|---|
| CA | 2846386 A1 | 2/2013 |
| SG | 2013235G-0001 | 4/2013 |

(Continued)

OTHER PUBLICATIONS

Limbs & Things Inc., Fundamentals of Laparoscopic Surgery Trainer System & Accessories Product Brochure, V.2 May 2016, 4 pages.

(Continued)

*Primary Examiner* — Peter R Egloff
(74) *Attorney, Agent, or Firm* — Merchant & Gould P.C.

(57) ABSTRACT

In one aspect a laparoscopic training device is disclosed. The laparoscopic training device includes a base that forms a working surface. The laparoscopic training device includes a plurality of walls surrounding the base and defining an interior volume. The interior volume simulates a gynecological surgery environment. A training feature is attached to at least one of the plurality of walls and base. The training feature includes at least one training element for simulating a laparoscopic surgery technique.

17 Claims, 16 Drawing Sheets

(56) References Cited

U.S. PATENT DOCUMENTS

| | | |
|---|---|---|
| 6,328,560 B1 | 12/2001 | Fujikawa et al. |
| 6,428,323 B1 | 8/2002 | Pugh |
| 6,488,507 B1 | 12/2002 | Stoloff et al. |
| 6,659,776 B1 | 12/2003 | Aumann et al. |
| 7,594,815 B2 | 9/2009 | Toly |
| 7,731,500 B2 | 6/2010 | Feygin et al. |
| 7,802,990 B2 | 9/2010 | Korndorffer, Jr. |
| 7,837,473 B2 | 11/2010 | Koh |
| 3,007,281 A1 | 8/2011 | Toly |
| 7,997,903 B2 | 8/2011 | Hasson et al. |
| 8,460,002 B2 | 6/2013 | Wang |
| 8,469,716 B2 * | 6/2013 | Fedotov ............... G09B 23/285 434/267 |
| 8,764,452 B2 | 7/2014 | Pravong et al. |
| D717,444 S | 11/2014 | Pastrick et al. |
| 9,123,261 B2 | 9/2015 | Lowe |
| 9,230,452 B2 | 1/2016 | Hyltlander et al. |
| 9,548,002 B2 | 1/2017 | Black et al. |
| D794,709 S | 8/2017 | Pastrick |
| D800,220 S | 10/2017 | Park |
| 9,842,515 B1 | 12/2017 | TenBrink |
| 9,959,785 B2 | 5/2018 | Tortola |
| D819,605 S | 6/2018 | Heath et al. |
| 10,037,715 B2 | 7/2018 | Toly et al. |
| D830,557 S | 10/2018 | Sebban |
| D838,854 S | 1/2019 | Lumme |
| D844,788 S | 4/2019 | Pastrick et al. |
| 2004/0142314 A1 | 7/2004 | Hasson |
| 2004/0175684 A1 | 9/2004 | Kaasa et al. |
| 2005/0064378 A1 | 3/2005 | Toly |
| 2005/0084833 A1 | 4/2005 | Lacey et al. |
| 2005/0142525 A1 | 6/2005 | Cotin et al. |
| 2007/0054254 A1 | 3/2007 | Cook |
| 2007/0166682 A1 | 7/2007 | Yarin et al. |
| 2008/0062299 A1 | 3/2008 | Matanhelia |
| 2009/0035740 A1 | 2/2009 | Reed et al. |
| 2010/0291522 A1 | 11/2010 | Cook et al. |
| 2011/0269109 A2 | 11/2011 | Miyazaki |
| 2012/0082970 A1 | 4/2012 | Pravong et al. |
| 2012/0308977 A1 | 12/2012 | Tortola |
| 2013/0105346 A1 * | 5/2013 | Ramkhelawan ....... A61B 50/20 206/370 |
| 2014/0051049 A1 * | 2/2014 | Jarc ...................... G09B 23/30 434/267 |
| 2014/0087346 A1 * | 3/2014 | Breslin ................ G09B 23/30 434/272 |
| 2014/0093852 A1 * | 4/2014 | Poulsen ............... G09B 23/285 434/262 |
| 2014/0220527 A1 | 8/2014 | Li et al. |
| 2015/0037773 A1 | 2/2015 | Quirarte Catano |
| 2016/0133158 A1 | 5/2016 | Sui et al. |
| 2016/0140876 A1 | 5/2016 | Jabbour |
| 2016/0232819 A1 | 8/2016 | Hofstetter et al. |
| 2016/0275819 A1 * | 9/2016 | Hofstetter ............ G09B 23/285 |
| 2017/0053563 A1 * | 2/2017 | Holloway ............... G09B 23/28 |
| 2017/0110032 A1 | 4/2017 | O'Brien et al. |
| 2017/0148356 A1 | 5/2017 | Black et al. |
| 2018/0233067 A1 | 8/2018 | Velasco et al. |
| 2018/0240366 A1 | 8/2018 | Felsinger et al. |
| 2019/0122582 A1 | 4/2019 | Munro et al. |

FOREIGN PATENT DOCUMENTS

| | | | |
|---|---|---|---|
| WO | 2007133209 A1 | 11/2007 | |
| WO | WO-2017173520 A1 * | 10/2017 | ............. B29C 35/02 |
| WO | 2018218175 A1 | 11/2018 | |

OTHER PUBLICATIONS

Mdedge Obgyn; https://www.mdedge.com/obgyn/article/150339/surgery/2017-update-minimally-invasive-gynecologic-surgery/page/0/1; Nov. 29, 2017; 2017 update on minimally invasive gynecologic surgery.

* cited by examiner

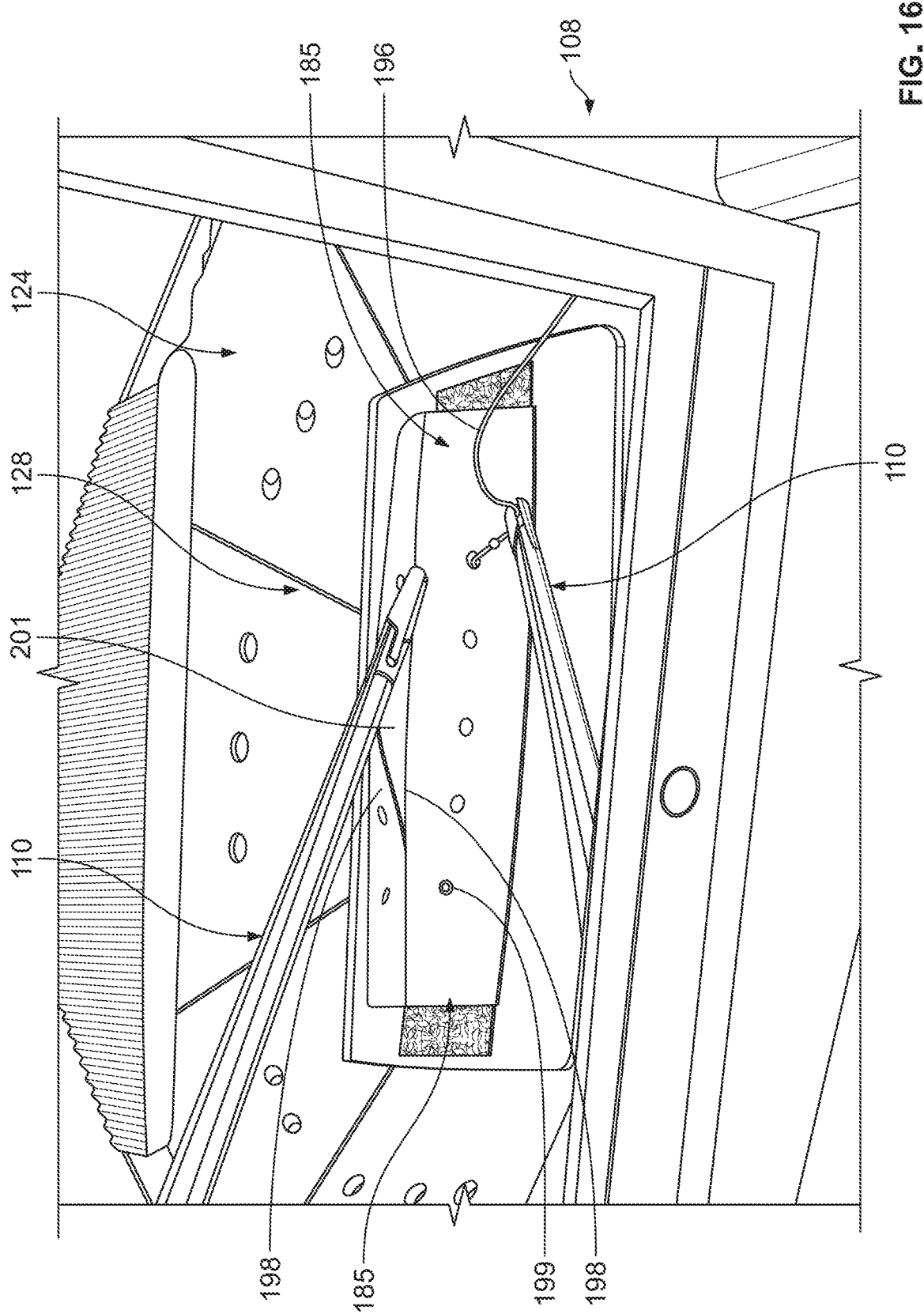

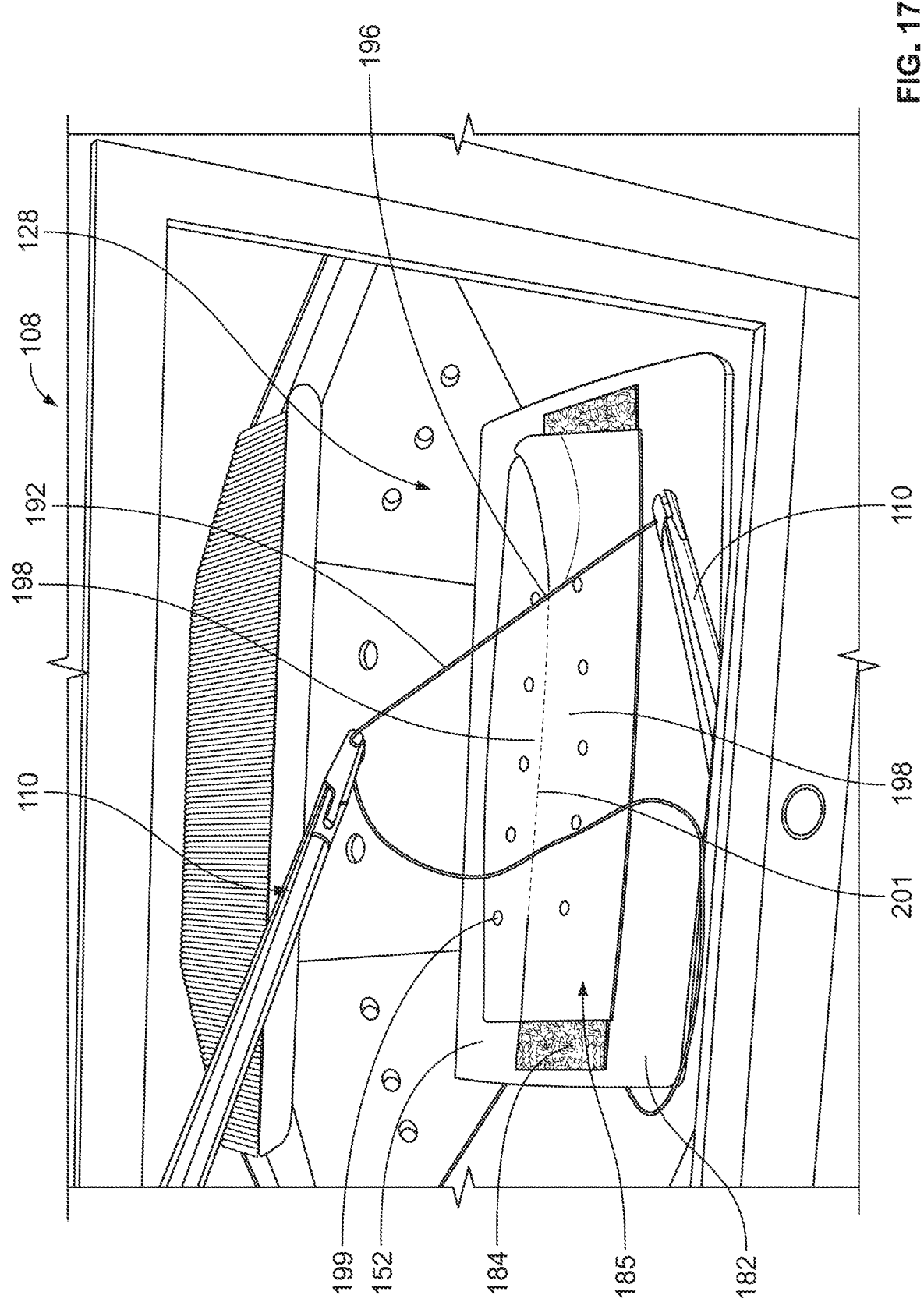

LAPAROSCOPIC TRAINING SYSTEM

CROSS-REFERENCE TO RELATED APPLICATIONS

This application claims priority to U.S. Provisional Patent Application 62/575,263 filed Oct. 20, 2017, the disclosure of which is incorporated herein by reference in its entirety.

BACKGROUND

Laparoscopic surgery is a common type of minimally invasive surgery performed with a variety of different laparoscopic instruments that are inserted into small incisions on a patient's body. Laparoscopic surgery provides less instance of bleeding, provides the patient with a lower amount of pain, and minimizes recovery time.

In order for the surgeon to see within the body during the surgery, an endoscope is utilized. The endoscope is an instrument that provides a video feed of the surgery site. To perform the surgery, the surgeon must manipulate the laparoscopic instruments within the body using the endoscope video feed as guidance. This can be difficult and requires practice.

In order to minimize life-threatening errors, there is a need for training instruments and testing protocols that simulate laparoscopic surgery. Such instruments and protocols may ensure that surgeons are proficient at laparoscopic surgery prior to working on patients. Further, there is a specific need for such instruments and testing protocols in gynecological medicine.

SUMMARY

The present disclosure relates generally to a training device. More specifically, the present disclosure relates to a training device that simulates a gynecological surgery environment that can be used to train and evaluate laparoscopy medical procedures.

In one aspect, a training device comprises: a base forming a working surface; a plurality of walls surrounding the base and defining an interior volume, the interior volume configured to simulate a gynecological surgery environment; and a training feature attached to at least one of the plurality of walls and base, the training feature having at least one training element.

In another aspect, a method of training for gynecological surgery comprises: providing a concave structure having a base and a plurality of walls extending away from the base, the base and the plurality of walls defining an interior volume, wherein the interior volume includes a plurality of pegs positioned therein; and providing instructions to transfer a ring between at least two pegs using a laparoscopic instrument.

In another aspect, a method of training for surgery comprising: providing a concave structure having a base and a plurality of walls extending away from the base, the base and the plurality of walls defining an interior volume, wherein the interior volume includes an attachment feature, wherein a training element is removably coupled to the attachment feature; providing laparoscopic instruments; and providing instructions to perform a training exercise on the training element using the laparoscopic instruments.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 16 illustrates another perspective view of a portion training system of FIG. 1 including the training device of FIG. 2 during a stitching training exercise.

FIG. 17 illustrates another perspective view of a portion training system of FIG. 1 including the training device of FIG. 2 during a stitching training exercise.

DETAILED DESCRIPTION

Figure 1:
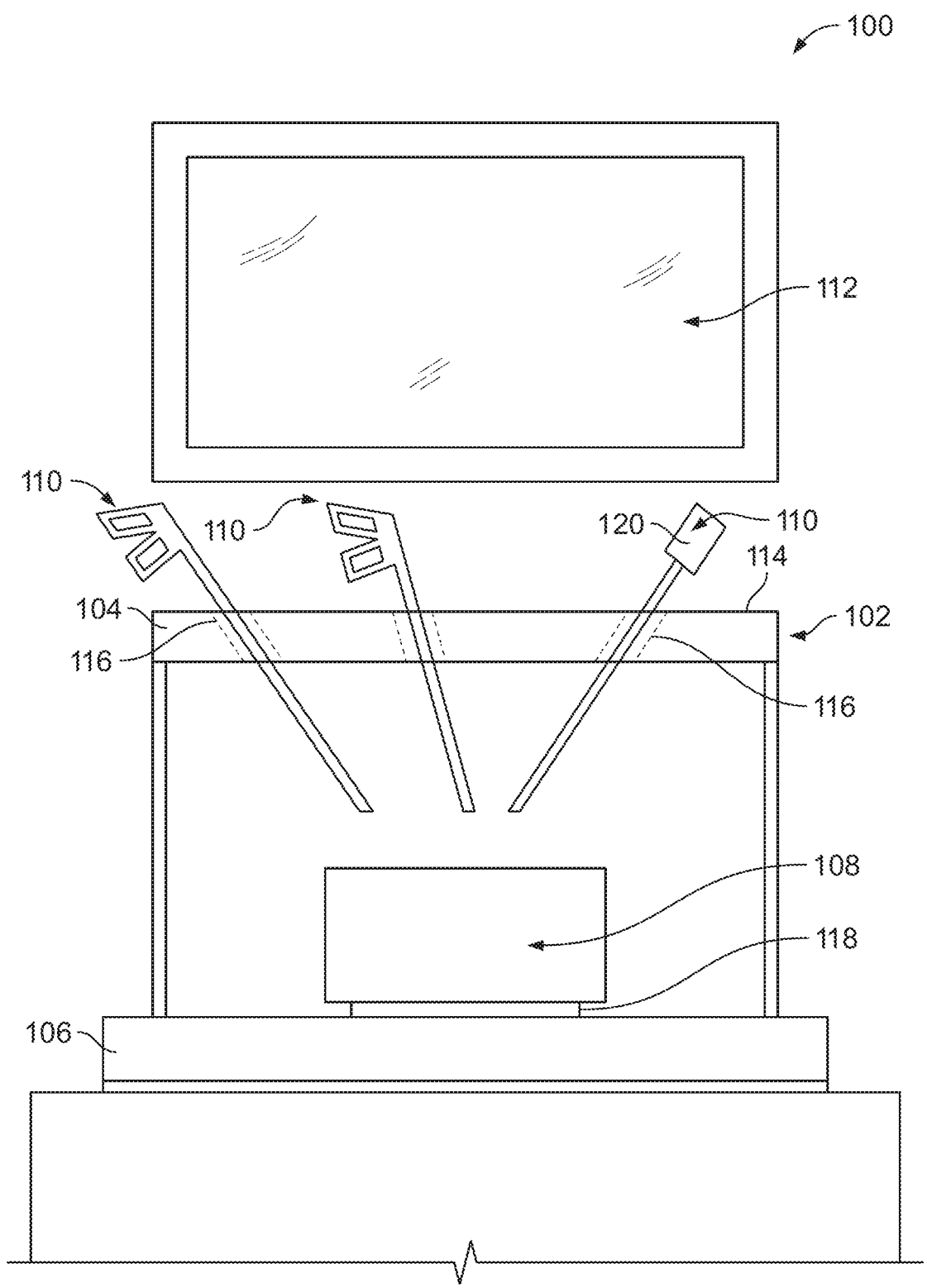
FIG. 1 illustrates a schematic diagram of a training system, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram of a training system 100. The training system 100 includes a platform 102 which includes a top 104 that is elevated above a working base 106. A training device 108 is positioned on the working base 106, below the top 104 of the platform 102. The training system 100 further includes a plurality of laparoscopic instruments 110 in communication with the platform 102 to facilitate a trainee to participate in a training exercise. The training system 100 also uses a display 112 to display an image (e.g., video image) transmitted from the laparoscopic instruments 110 and/or a mounted camera.

The training system 100 is configured to allow a trainee to complete a series of training exercises that involve the trainee manipulating the laparoscopic instruments 110 to interact with the training device 108 positioned on the working base 106. As the trainee manipulates the laparoscopic instruments 110, the trainee can observe the display to help the trainee to properly guide the laparoscopic instruments 110 to complete the training exercise. The training system 100 mimics a laparoscopic surgery environment to allow the trainee to develop laparoscopic skills in a controlled non-surgery environment.

The platform 102 can simulate a surgical site. For example, the top 104 of the platform can include a membrane 114 that simulates human skin through which the laparoscopic instruments 110 pass through. In some examples, the membrane 114 can include a plurality of openings 116 that are configured to receive the laparoscopic instruments 110. In some examples, the top 104 obstructs a trainee's line of sight to the working base 106.

In some examples, the working base 106 is a base plate or tray. In other examples, the working base 106 is a table-top or like planar surface. The working base 106 is configured to receive a plurality of different training devices 108, and a spacing between the top 104 and the working base 106 can simulate the spacing within the human body. For example, the working base 106 can be spaced away from the top 104 so that when a training device 108 is positioned on the working base 106, the platform 102 mimics a human body surgical site. In some examples, the working base 106 can have securing features 118 to secure the training device 108 to the working base 106.

The training device 108 can be any device that mimics an interior portion of the human body. The training device 108 is positioned on the working base 106 in a position to allow the trainee to manipulate the laparoscopic instruments 110 to interact with the training device 108. The training device 108 can be secured to the securing features 118 of the working base 106 to prevent the training device 108 from moving during a training exercise.

The laparoscopic instruments 110 can include, but are not be limited to, an endoscope, a grasper, scissors, clip appliers, needle holders, etc. In some examples, at least one of the laparoscopic instruments 110 is an endoscope 120. The endoscope 120 can be a standard laparoscopic endoscopic having a camera. Video images from the camera can be broadcast to the display 112 so that a trainee can observe the view gained by the camera of the endoscope 120.

Figure 2:
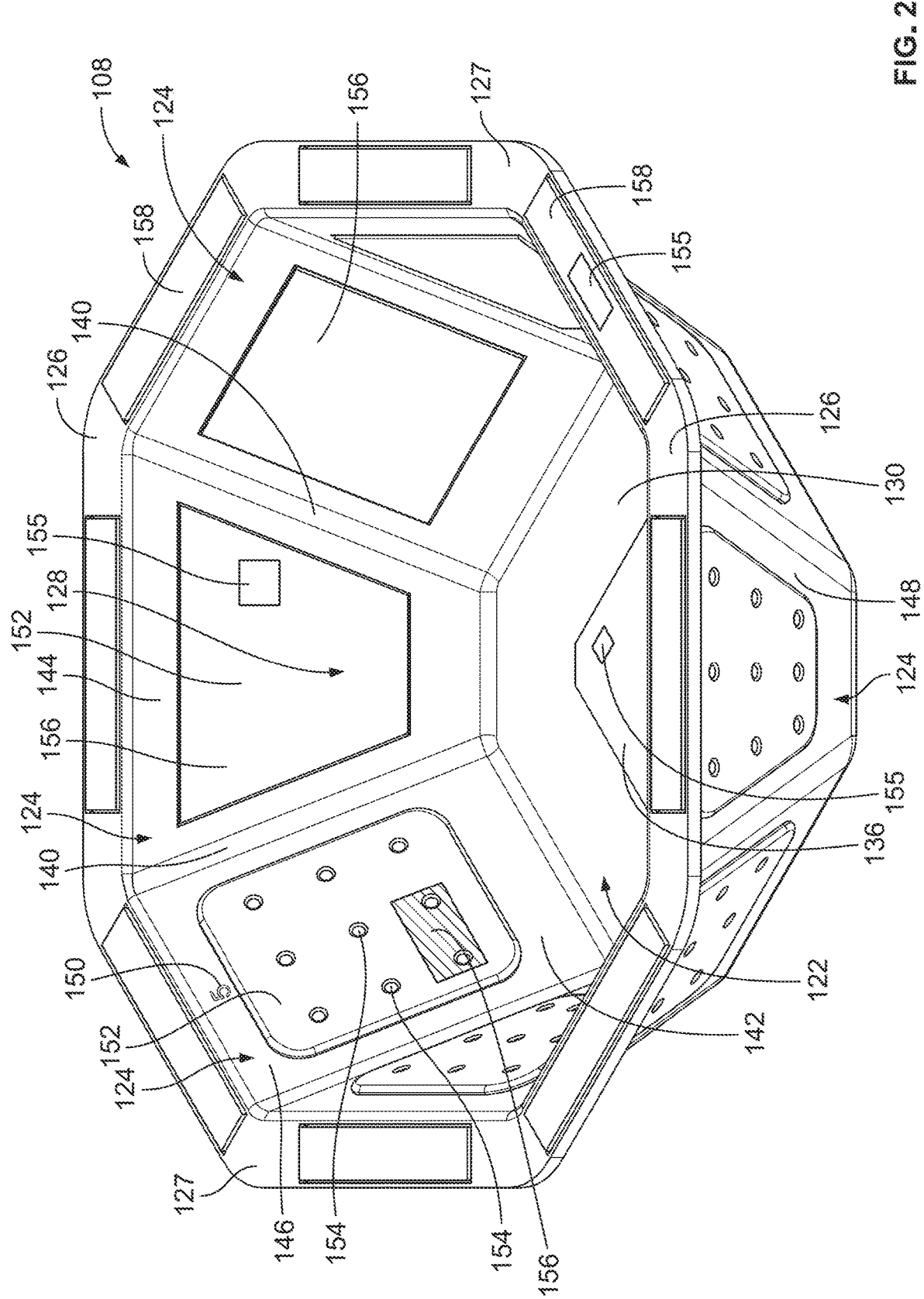
FIG. 2 illustrates a perspective view of a training device, according to one embodiment of the present disclosure, to be used with the training system of FIG. 1.
Figure 3:
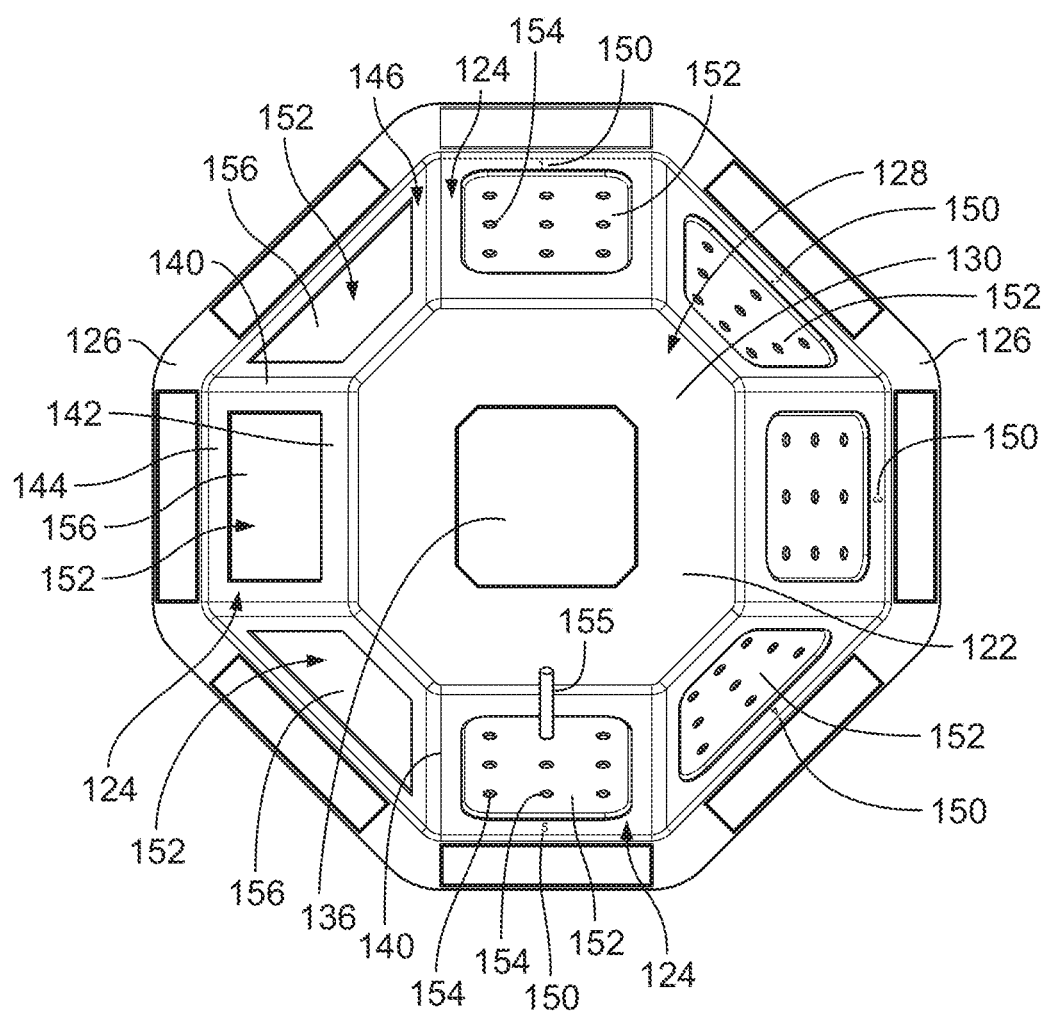
FIG. 3 illustrates a top view of the training device.
Figure 4:
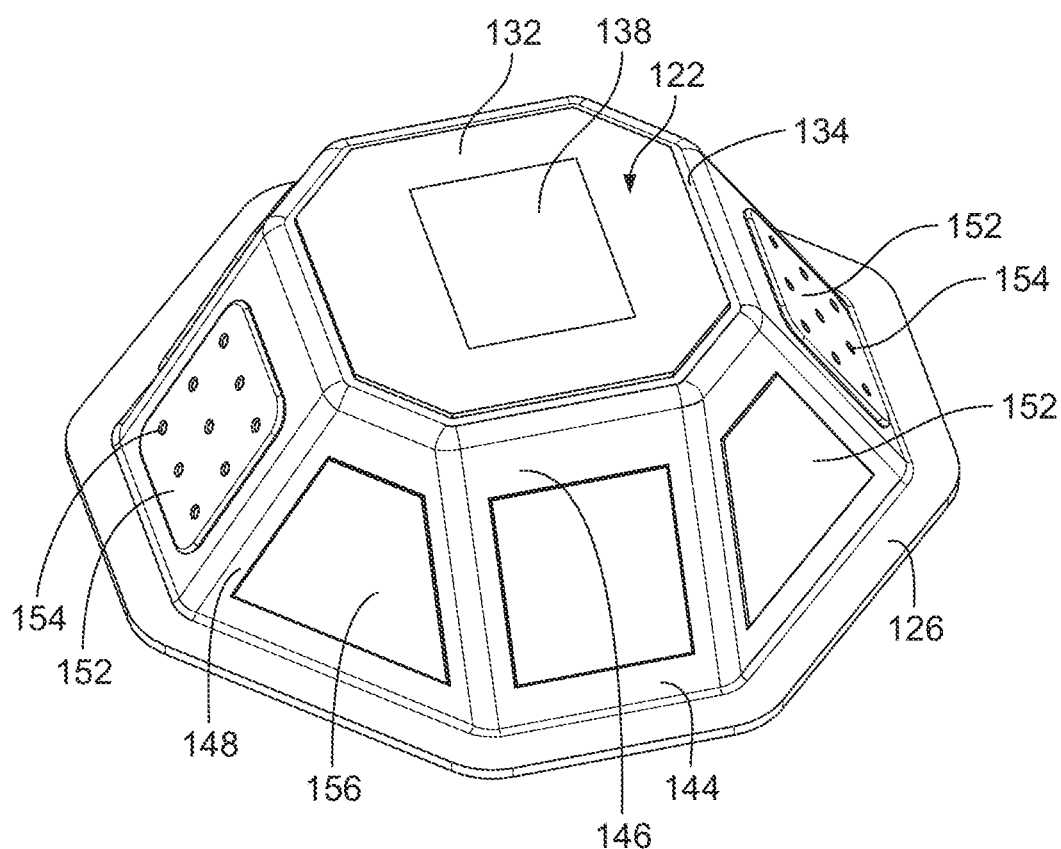
FIG. 4 illustrates a bottom perspective view of the training device.

FIG. 2 shows a top perspective view of the training device 108. FIG. 3 shows a top view of the training device 108. FIG. 4 shows a bottom perspective view of the training device 108. The training device 108 includes a base 122, a plurality of walls 124, and a lip 126. In some examples, the walls 124, base 122, and lip 126 are an integral piece. In other examples, the walls 124, base 122, and lip 126 are distinct individual pieces. The walls 124 extend between the base 122 and the lip 126. Together, the walls 124 and the base 122 form a partially enclosed interior volume 128. In some examples, the training device 108 has a concave shape. In some examples, the training device 108 is constructed of a plastic, such as ABS plastic. However, it is considered to be within the scope of the present disclosure that the training device 108 can be constructed of a variety of other materials.

The base 122 is configured to be substantially planar. The base 122 has a top working surface 130, an opposite bottom surface 132, and an outer edge 134. In some examples, the top working surface 130 of the base 122 is configured to receive a training feature 152 having at least one training element 155 to facilitate a particular training exercise.

In some examples, the top working surface 130 can include an attachment feature 136. The attachment feature 136 can be used to attach the training feature 152 to the top working surface 130. In some examples, the attachment feature 136 is a hook and loop fastener. In other examples, the attachment feature 136 is a reusable adhesive. In other examples still, the attachment feature 136 is a mechanical fastener such as a button or a magnet. In some examples, the top working surface 130 can include a plurality of attachment features 136. The attachment feature(s) 136 can occupy all of, or a portion of, a surface area of the top working surface 130.

The bottom surface 132 is configured to support the training device 108 on a surface, such as the working base 106. In some examples, the bottom surface 132 can include an attachment feature 138. In some examples, the attachment feature 138 is configured to mate with a support surface, such as the working base 106, to prevent unwanted movement of the training device 108 on the support surface. In some examples, the attachment feature 138 is configured to mate with the securing feature 118 of the working base 106 of the platform 102. In some examples, the attachment feature 138 is a hook and loop fastener. In other examples, the attachment feature 138 is a reusable adhesive. In other examples still, the attachment feature 138 is a mechanical fastener such as a button or a magnet. In some examples, the bottom surface 132 can include a plurality of attachment features 138. The attachment feature(s) 138 can occupy all of, or a portion of, a surface area of the bottom surface 132.

The walls 124 are positioned at the outer edge 134 of the base 122 and extend away from the working surface top, opposite the bottom surface 132. As depicted, the base 122 is generally octagonal in shape. However, it is considered within the scope of the present disclosure, that the base 122 can be any of a variety of different shapes.

The walls 124 are connected to one another at sides 140. Each wall has a bottom side 142, a top side 144, an interior face 146, and an exterior face 148. Each wall 124 is connected to the base 122 at the bottom side 142 and connected to the lip 126 at the top side 144. Further, each interior face 146 faces in a direction toward the interior volume 128 of the training device 108, and each exterior face 148 faces in a direction away from the interior volume 128. In the depicted example, the walls 124 angle away from the base 122 as they extend toward the lip 126. This provides an access to the interior volume 128 that is larger than the top working surface 130 of the base 122. In some examples, the walls 124 can be a variety of different shapes. In other examples, the walls are all the same shape. In the depicted examples, the training device 108 includes eight walls. In other examples, the training device 108 can include less than eight walls. In other examples still, the training device 108 can include more than eight walls.

The walls 124 can further include indicia 150 disposed on the interior face 146. In some examples, less than all of the walls 124 include indicia 150. In some examples, all of the walls 124 include indicia 150. The indicia 150 can be of a variety of types to allow the user to identify particular walls 124 and to differentiate between walls 124. For example, the indicia 150 can be numbers, letters, symbols, etc. The indicia 150 can be used by a trainee to identify particular walls 124 during a training exercise.

In some examples, the walls 124 include training features 152 disposed thereon. The training features 152 can be integral to a wall 124. In other examples, the training features 152 can be removable from a wall 124. In some examples, less than all of the walls 124 include training features 152. In some examples, all of the walls 124 include training features 152.

The training features 152 allow the trainee to interact differently with the training device 108 depending on the particular training exercise. For example, in one training exercise, the trainee might not engage with the training features 152 of the walls 124. In other examples, the trainee might engage with a select few, or a single, training feature 152 on the walls 124 in one training exercise. In other examples still, the trainee may engage with all the training features 152 of the walls 124 in one training exercise. In some examples, the training features 152 allow the walls 124 to be used in a variety of different ways to allow a variety of different training exercises to be performed within the interior volume 128 of the training device 108. In some examples, the training features 152 can include at least one aperture 154 on either or both the interior face 146 and exterior face 148. In other examples, the training features 152 can include an attachment feature 156 on either or both the interior face 146 and exterior face 148.

As shown, the training features 152 of each wall 124 can include a plurality of apertures 154. Specifically, the apertures 154 can be arranged to be evenly spaced on the wall 124 in a variety of different patterns. Each aperture 154 is sized and shaped to receive and retain a training element 155 (see FIG. 3) having a peg shape. In some examples, each aperture can include a rubber material therein to retain the training element 155 within the aperture 154. The apertures 154 can be of a variety of different sizes and shapes and be configured to receive and retain a variety of differently sized training elements 155. In some examples, the training element 155 can be positioned within multiple apertures 154 at the same time. Examples of training elements 155 can include, but are not limited to, pegs, hooks, bars, plates, electronics, etc. In some examples, the apertures 154 can be used to anchor the training device 108 to a support surface, such as the working base 106.

The training features 152 that include attachment features 156 can also facilitate the mounting of another type of training element 155 such as simulated tissue. In some examples, each attachment feature 156 is a hook and loop fastener. In other examples, the attachment feature 156 is a reusable adhesive. In other examples still, the attachment feature 156 is a mechanical fastener such as a button or a magnet. In some examples, the attachment feature 156 can be used to anchor the training device 108 to a support surface, such as the working base 106.

In some examples, each wall 124 can have a plurality of training features 152 disposed thereon. In some examples, each wall 124 can include at least one aperture 154 and at least one attachment feature 156. In other examples still, a wall 124 can be bare of training features 152. The training features 152 can occupy all of, or a portion of, an interior face 146 of each wall 124.

The lip 126 is shown to surround the top side 144 of the walls 124 of the training device 108. In some examples, the lip 126 can have a working face 127 that is substantially parallel with the top working surface 130 of the base 122. In some examples, the lip 126 includes at least one attachment feature 158 on the working face 127. In some examples, the lip 126 includes a plurality of attachment features 158 disposed around the lip 126 to attach a training element 155. In some examples, each attachment feature 158 corresponds with each wall 124. In some examples, each attachment feature 158 is a hook and loop fastener. In other examples, the attachment feature 158 is a reusable adhesive. In other examples still, the attachment feature 158 is a mechanical fastener such as a button or magnet.

Figure 5:
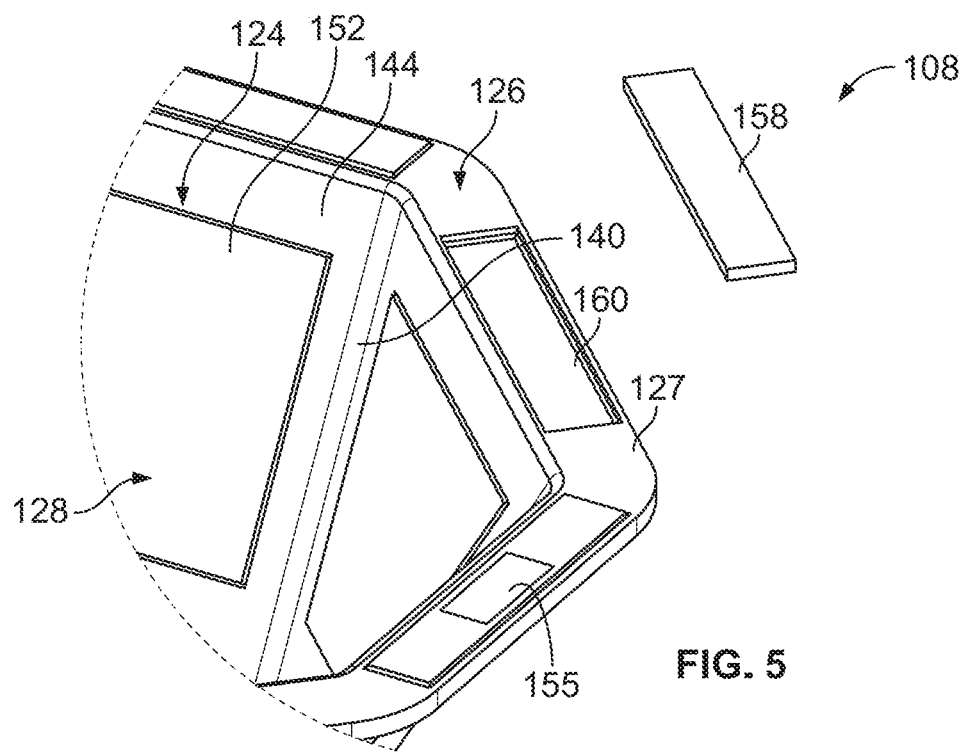
FIG. 5 illustrates a partial exploded view of a portion of the training device.

FIG. 5 shows a perspective view of a portion of the training device 108, specifically a portion of the lip 126. As shown, the lip 126 includes an attachment feature recess 160 that is configured to receive the attachment feature 158. In some examples, the recess 160 can be disposed around the entire working face 127 of the lip 126. In other examples, the lip 126 can include a plurality of recesses 160 for a plurality of attachment features 158. In some examples, the attachment feature 158 can overlap the working face 127 of the lip 126

Figure 6:
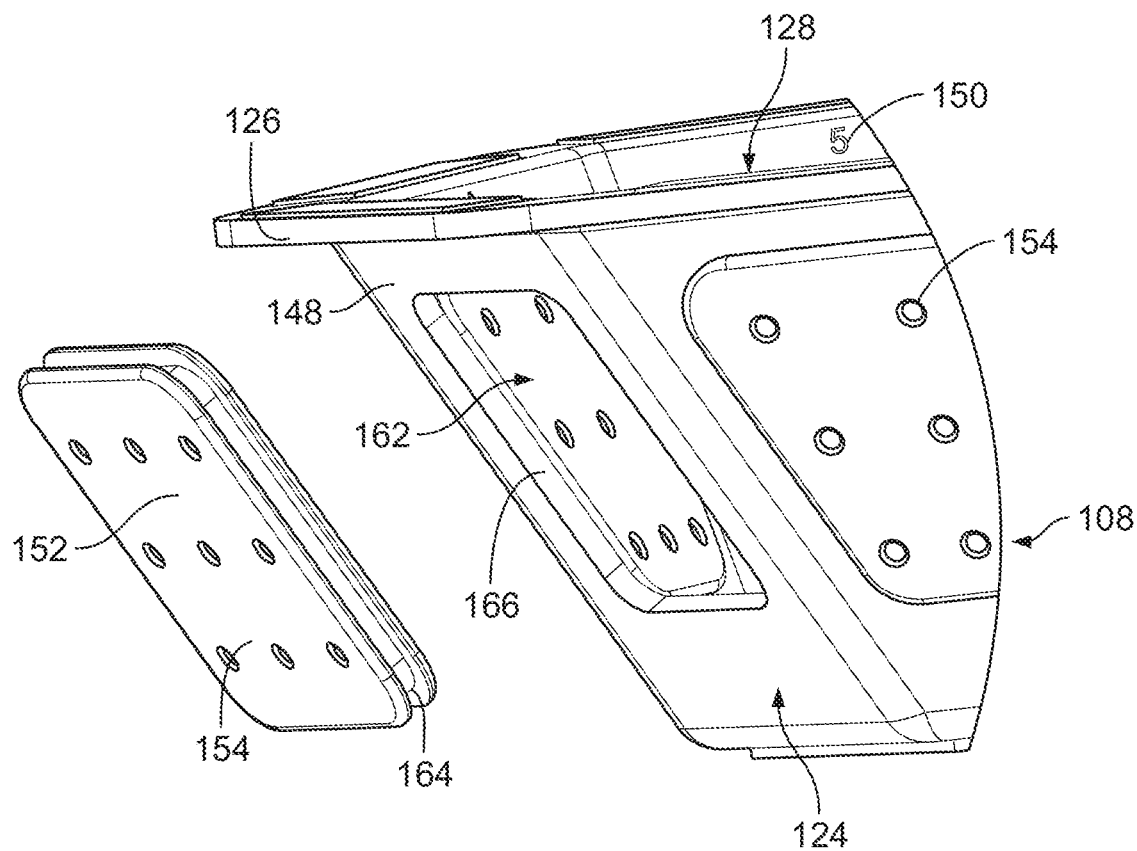
FIG. 6 illustrates another partial exploded view of a portion of the training device.

FIG. 6 shows a perspective view of a portion of the training device 108. As shown, the training feature 152 is shown as an insert and separated from the wall 124. In some examples, all of the training features 152 are removable and interchangeable between walls 124. In the depicted embodiment, the wall 124 is shown to have a port 162 that is sized and shaped to receive the training feature 152. In the depicted example, the training feature 152 includes a channel 164 disposed at a periphery. The channel 164 is configured to receive an edge 166 of the port 162 to secure the training feature 152 within the port 162. In some examples, the training feature 152 is constructed of a flexible material. For examples, the training feature 152 can be constructed of a rubber or other like material.

Figure 7:
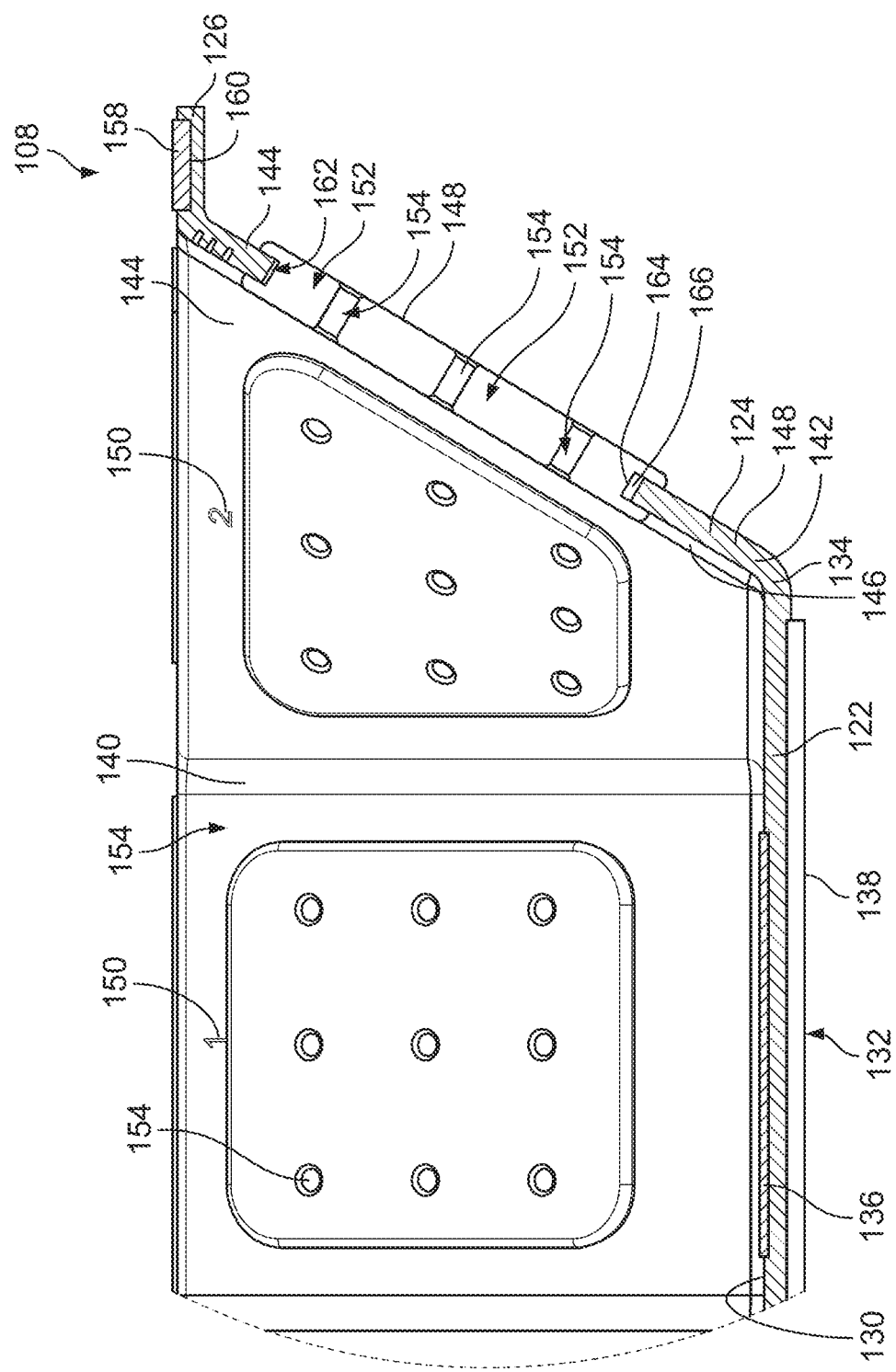
FIG. 7 illustrates a partial cross-sectional view of the training device.

FIG. 7 shows a partial cross-sectional view of the training device 108. As shown, the edge 166 is positioned within the channel 164 of the training feature 152 to retain the training feature within the port 162 of the wall 124.

Figure 8:
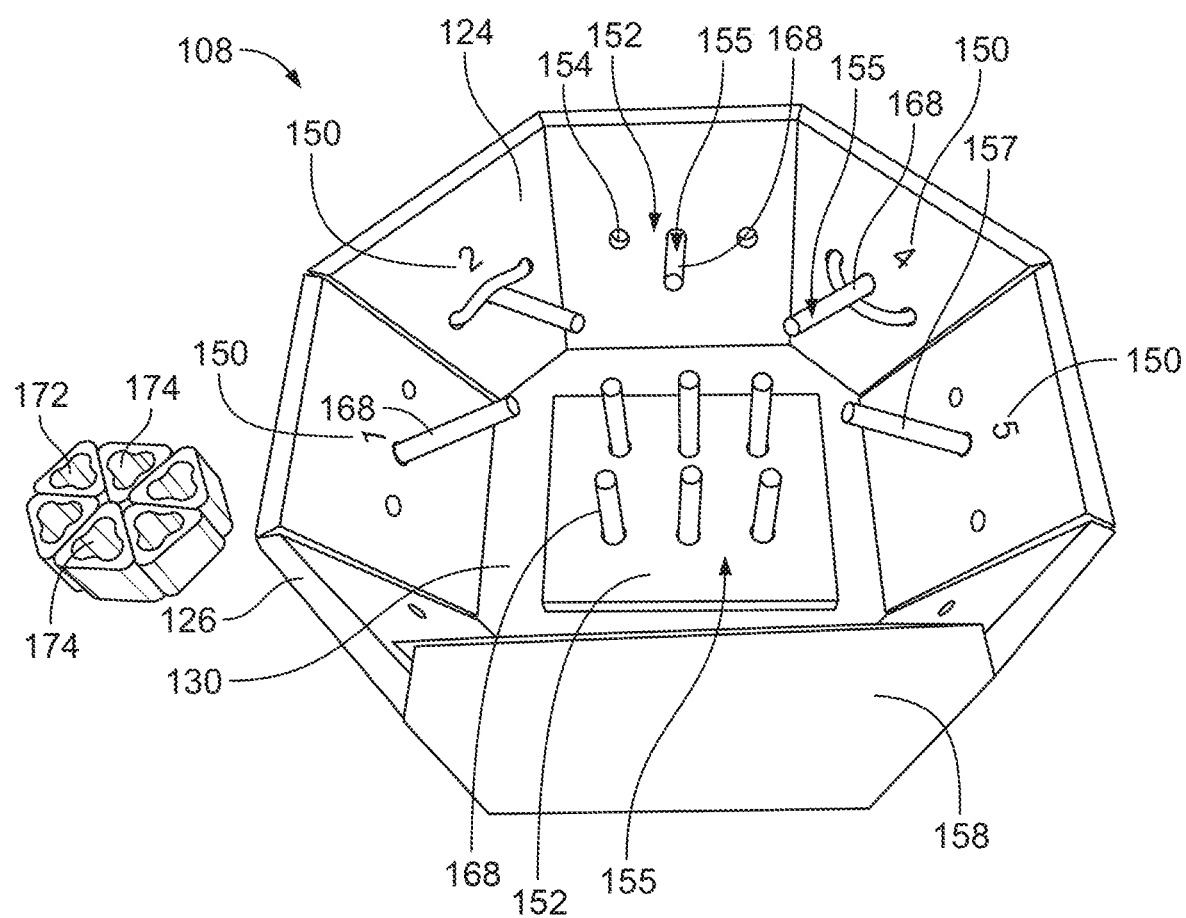
FIG. 8 illustrates a top perspective view of the training device during a training exercise.

FIG. 8 shows a perspective top view of the training device 108 configured for a training exercise. In the depicted example, a plurality of walls 124 include training elements 155, specifically pegs 168, disposed within apertures 154. Further, the top working surface 130 of the base 122 includes a training feature 152 such as a platform having a plurality of training elements 155, specifically pegs 168 attached thereto. In some examples, the training feature 152 is mated and attached to the attachment feature 136 of the base 122. The training device 108 can also include removable rings 172, each having an aperture 174 sized and shaped to receive a peg 168. The rings 172 can have a variety of different shapes and sizes including, for example, rounded shapes and other similar types of shapes. The training exercise includes instructing the trainee to manipulate the rings 172 with laparoscopic instruments 110, specifically graspers, between different pegs 168. Such an exercise trains manual dexterity.

Figure 9:
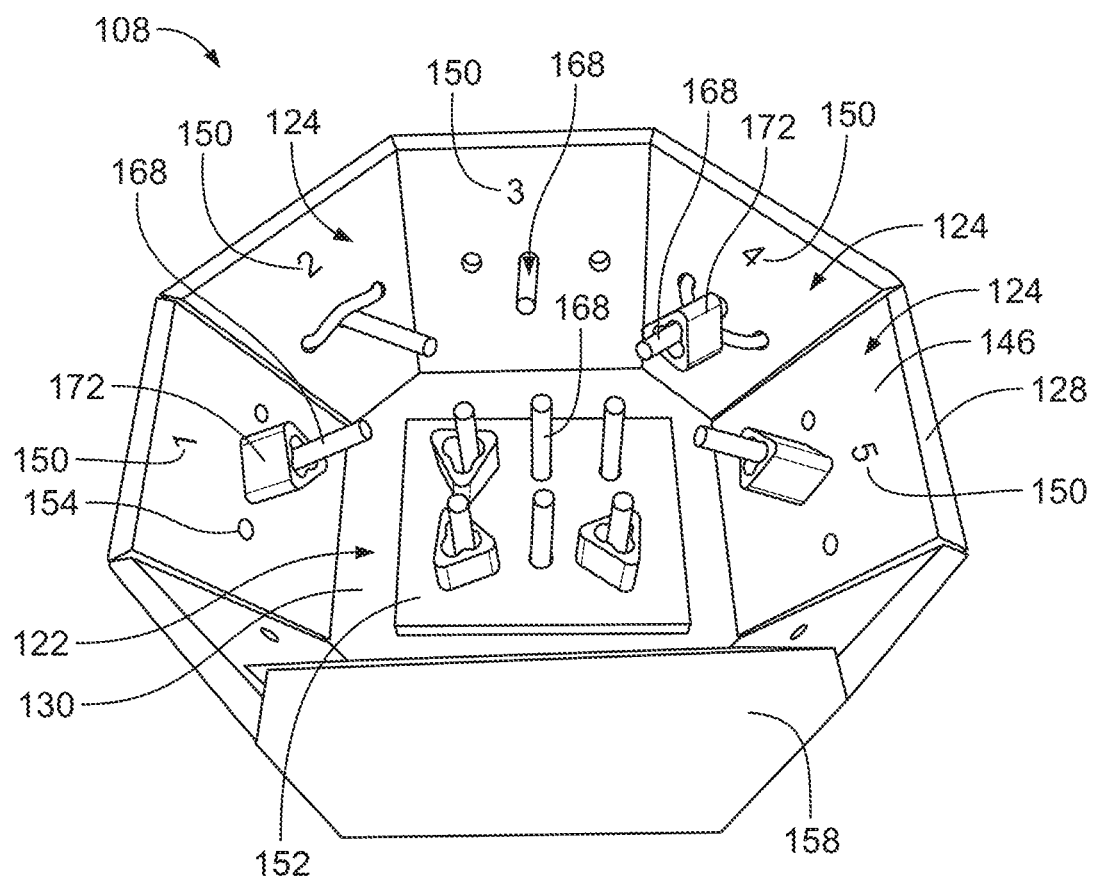
FIG. 9 illustrates another top perspective view of the training device during a training exercise.

FIG. 9 shows the rings 172 positioned around a variety of pegs 168 at a variety of different locations. In some examples, the training exercise can instruct a trainee to transfer and move a ring 172 from one location (i.e., on a peg 168 on the base 122 or a wall 124) to an instructed location (i.e., on a different peg 168 on the base 122 or a different wall 124). For example, the training exercise can instruct the trainee to move a ring 172 on the base 122 to a peg 168 on a wall 124 labeled with indicia 150 as wall "2." In other examples, the training exercise can instruct the trainee to transfer a ring 172 between pegs 168 on the same wall 124, between pegs 168 on the base 122, or between pegs 168 on different walls 124. Such a training exercise tests the trainee's ability to skillfully manipulate the laparoscopic instruments 110 within a confined space (i.e., the interior volume 128 of the training device 108). As shown, only five walls 124 are used in the training exercise. However, it is considered within the scope of the present disclosure that additional or less walls 124 may be utilized during the training exercise.

Figure 10:
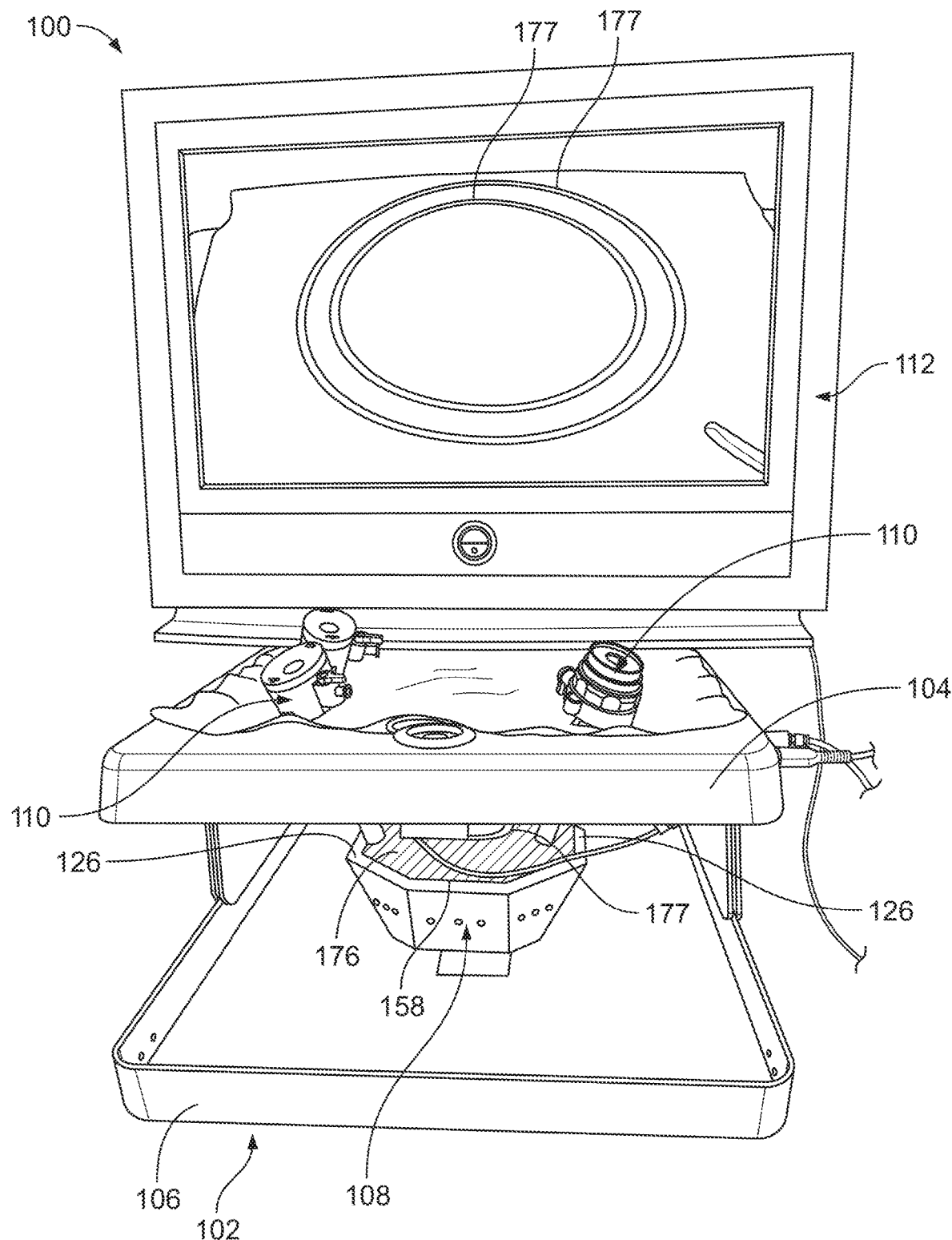
FIG. 10 illustrates a perspective view of the training system of FIG. 1 including the training device of FIG. 2 during a training exercise.

FIG. 10 shows a perspective view of the training system 100 during a cutting training exercise. As shown, the display 112 is depicting an image captured by the endoscope 120. During the cutting training exercise, a piece of fabric 176 having concentric circles 177 is positioned over the training device 108 at the lip 126. In some examples, at least one attachment feature 158 positioned at the lip 126 secures the fabric 176 to the training device 108. In some examples, the fabric 176 is gauze. During the training exercise, the trainee is instructed to grasp the fabric 176 with the laparoscopic instruments 110, specifically graspers, and cut between the concentric circles 177 using laparoscopic scissors. In some examples, the trainee must complete the cut in a predetermined time limit.

Figure 11:
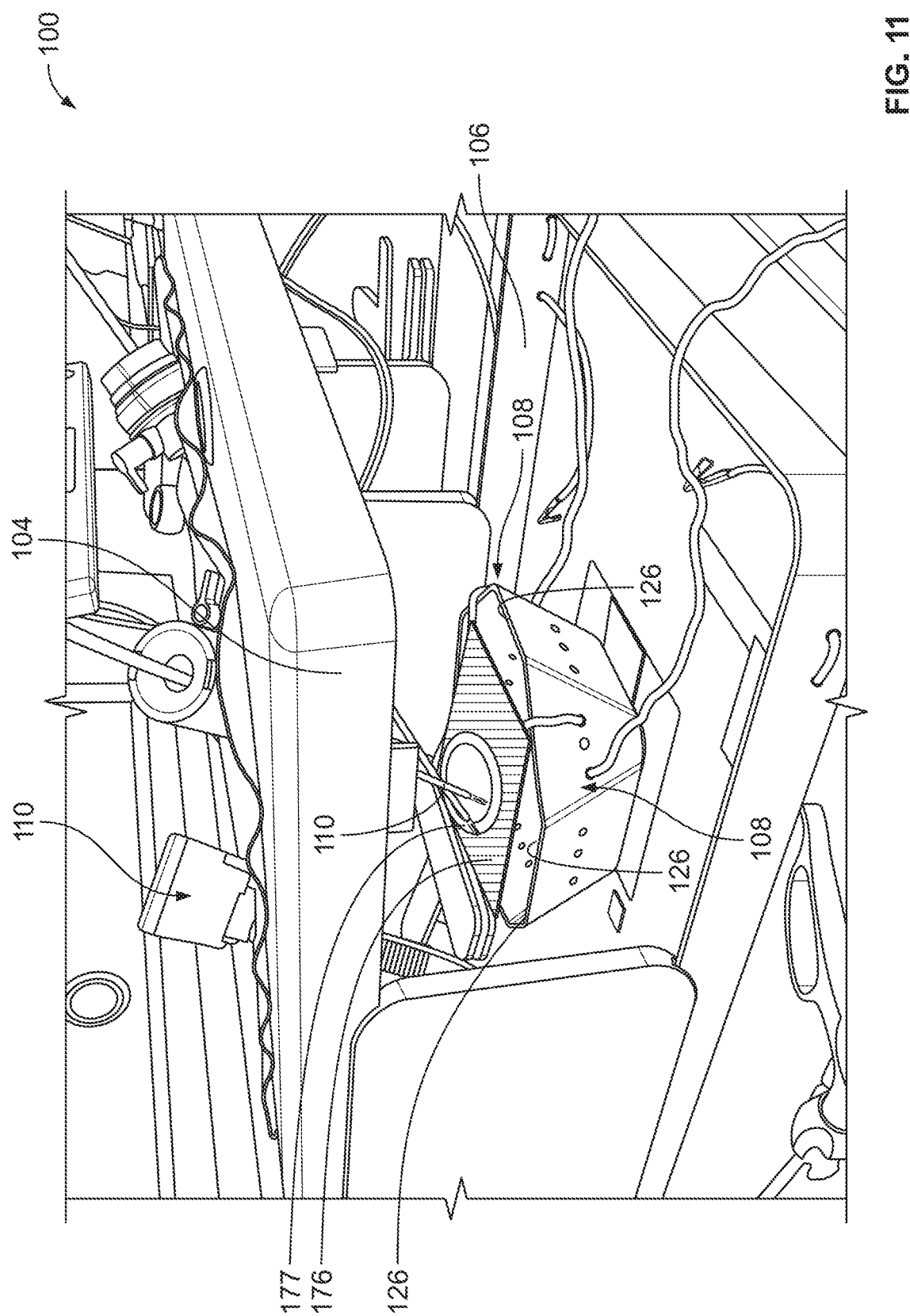
FIG. 11 illustrates a side perspective view of the training system of FIG. 1 including the training device of FIG. 2 during a training exercise.

FIG. 11 shows a side view of the training system 100 during the cutting training exercise. As shown, the fabric 176 is positioned over the lip 126 and the laparoscopic instruments 110 are configured to pass through the top 104 to allow the trainee to manipulate the laparoscopic instruments 110 to engage with the training device 108, and the fabric 176.

Figure 12:
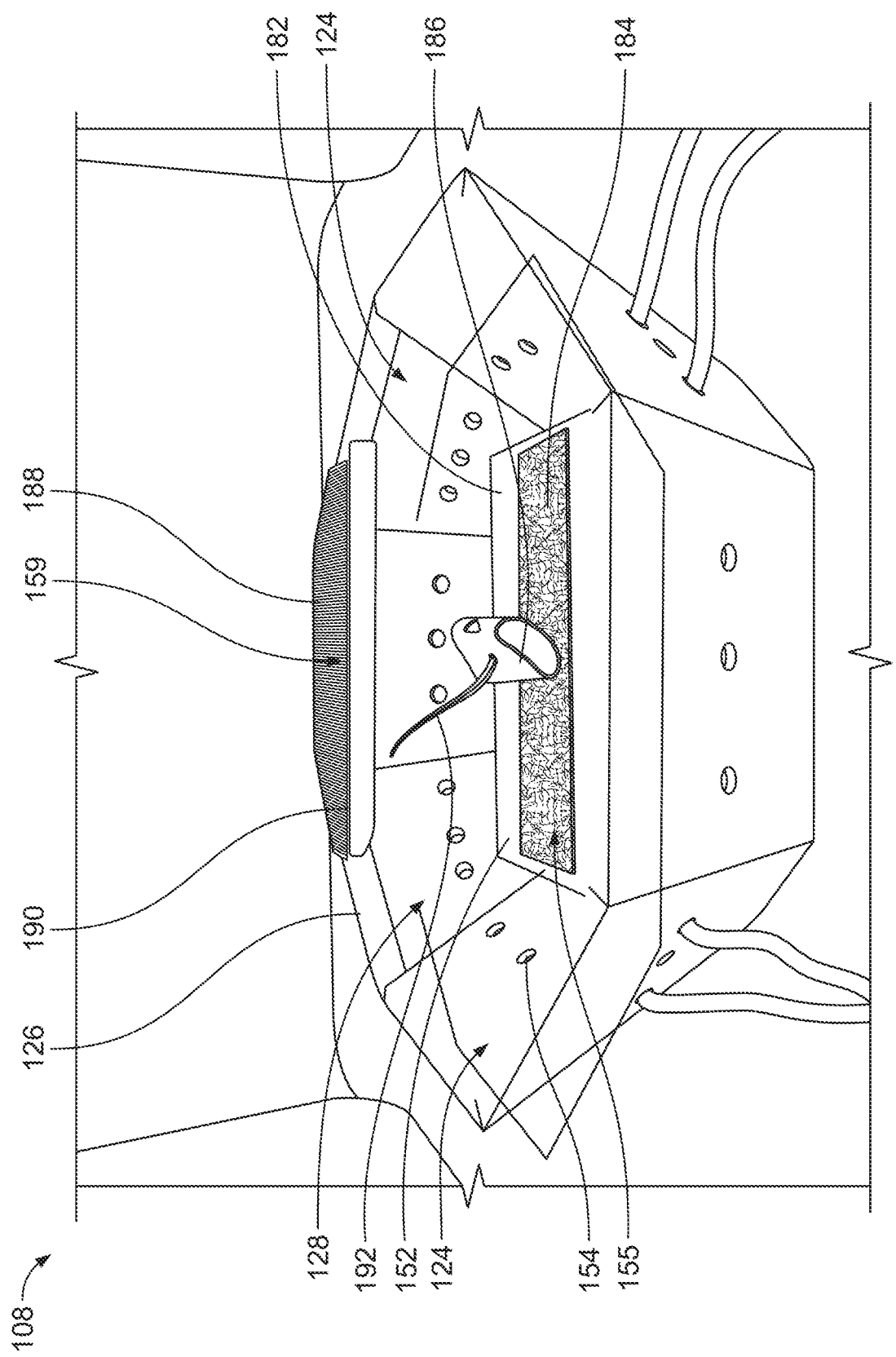
FIG. 12 illustrates a top perspective view of the training device of FIG. 2 during a stitching training exercise.

FIG. 12 shows a top perspective view of view of the training device 108 in preparation for a stitching exercise. In some examples, the trainee is instructed to complete a particular stitching (e.g., suturing) skill at least partially within the confines of the interior volume 128 of the training device 108. A training element 155, specifically a simulated tissue 186, is positioned on the top working surface 130 of the base 122, preferably secured to the attachment feature 136. The training feature 152 is depicted as a platform having an additional attachment feature 184 disposed on a top surface 182 thereof. The additional attachment feature 184 of the training feature 152 is configured to hold a portion of simulated tissue 186 thereon. Specifically, the attachment feature 184 helps to retain the simulated tissue 186 on the training feature 152.

A secondary training feature 159 is shown in communication with the training device 108. In some examples, the secondary training feature 159 is a platform. The secondary training feature 159 is disposed on the working face 127 of the lip 126. The secondary training feature 159 can be attached to the attachment feature 158 on the lip 126. The secondary training feature 159 includes an additional attachment feature 188 positioned on a top surface 190 thereof. The secondary training feature 159 can provide an additional location for the trainee to complete a particular stitching training exercise. Like the attachment feature 184 on the training feature 152, the attachment feature 188 helps to retain the simulated tissue 186 on the top surface 190.

Figure 13:
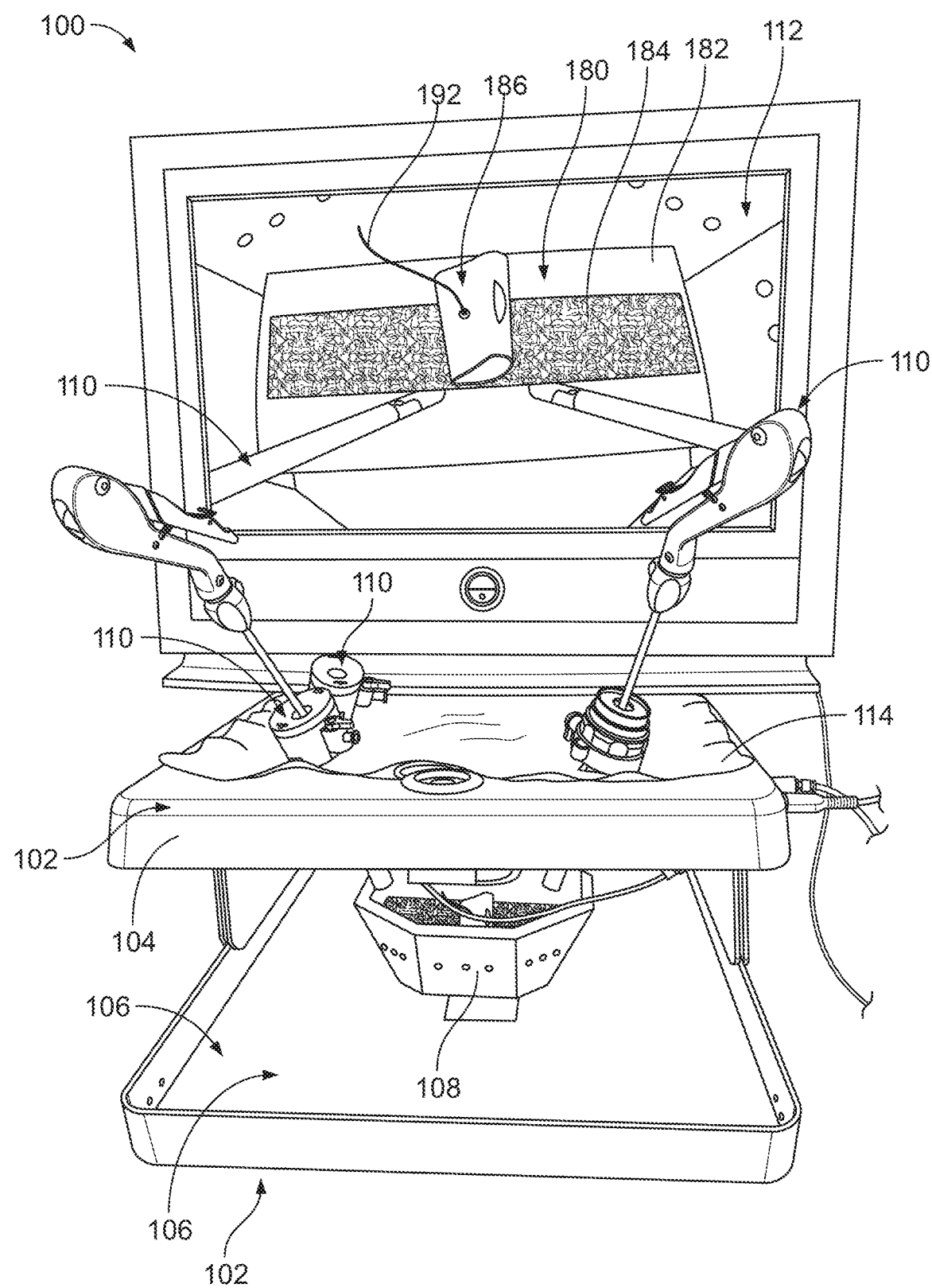
FIG. 13 illustrates a perspective view of the training system of FIG. 1 including the training device of FIG. 2 during a stitching training exercise.

FIG. 13 shows the training system 100 during the stitching training exercise. As described above, the display 112 shows the image captured by the endoscope 120. During the training exercise, the trainee is instructed to manipulate the simulated tissue 186 with the laparoscopic instruments 110, specifically graspers, and perform a stitching exercise.

In some examples, the trainee may be required to manipulate the simulated tissue 186, laparoscopic instruments 110, and a suture 192 to tie a variety of surgical knots with the suture 192 on the simulated tissue 186 within the interior volume 128 of the training device 108. Such examples may be representative of an intracorporeal suture performed during surgery. An intracorporeal suture is a stitch, or suture, performed inside an interior cavity of the human body.

In other examples, the trainee may be required to manipulate the simulated tissue 186, laparoscopic instruments 110, and a suture 192 to tie a variety of surgical knots representative of an intracorporeal suture with the suture 192 on the simulated tissue 186 and with the simulated tissue 186 positioned on the secondary training feature 159.

In some examples, the trainee may be required to manipulate the simulated tissue 186, laparoscopic instruments 110, and a suture 192 to tie a variety of surgical knots with the suture 192 on the simulated tissue 186 where the trainee ties the surgical knots outside of the interior volume 128 of the training device 108. Once the knot is tied, the trainee reintroduces the knot back into the interior volume 128 of the training device 108. Such an example is representative of an extracorporeal suture performed during surgery. An extracorporeal suture is a stitch, or suture, performed outside the interior cavity of the human body and then reintroduced back into cavity until tight. In other examples, the trainee must manipulate the simulated tissue 186, laparoscopic instruments 110, and a suture 192 to tie a variety of surgical knots representative of an extracorporeal suture with the suture 192 on the simulated tissue 186 and with the simulated tissue 186 positioned on the secondary training feature 159.

Figure 14:
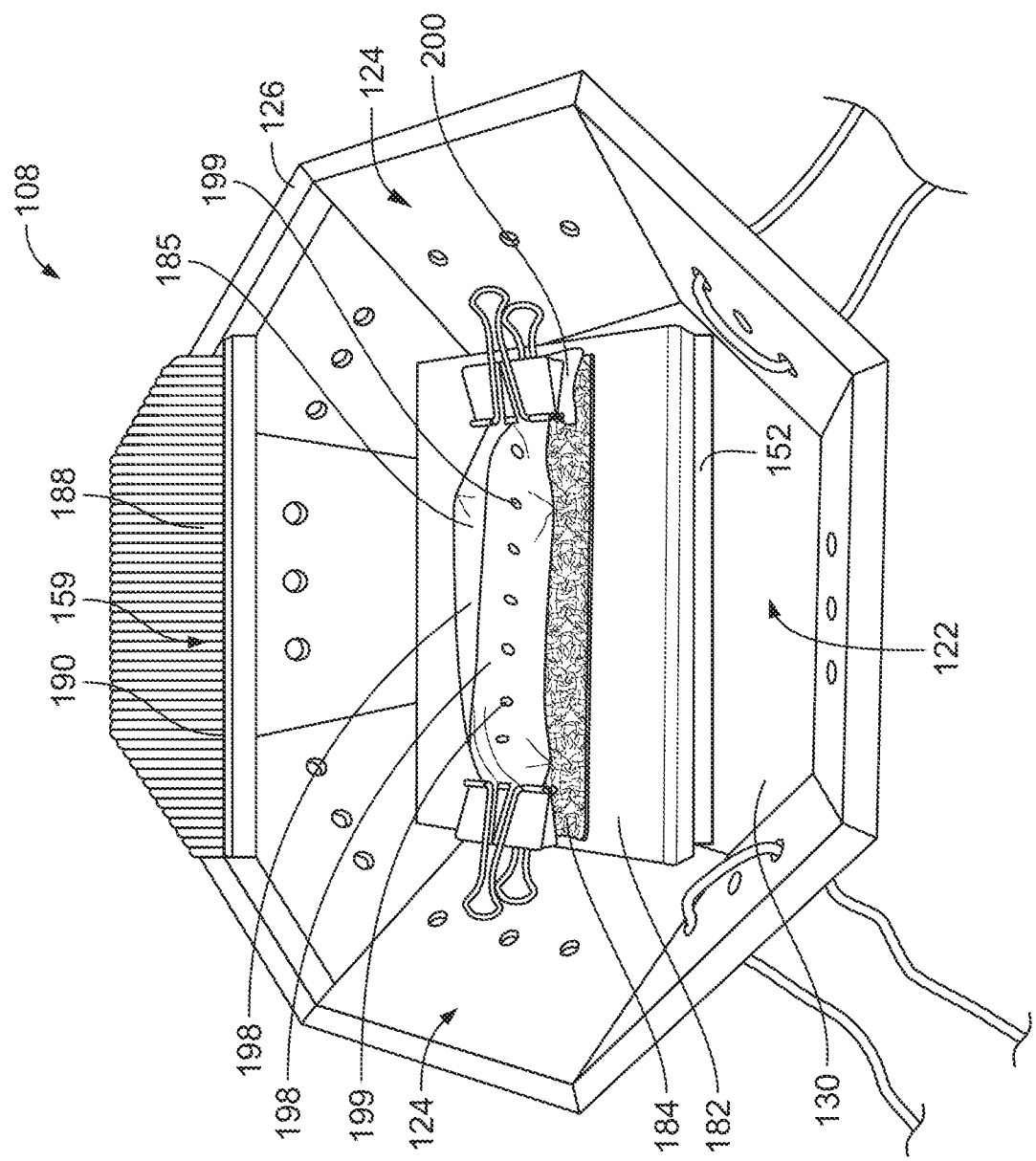
FIG. 14 illustrates a perspective view of the training device of FIG. 2 during a stitching training exercise.

FIG. 14 shows a perspective view of the training device 108 in preparation for an additional stitching exercise. Like the stitching exercise described above with reference to FIGS. 12 and 13, during the stitching exercise of FIG. 14 the trainee is instructed to complete a particular stitching (e.g., suturing) skill at least partially within training device 108. Specifically, a trainee must manipulate a simulated tissue 185 retained by the attachment feature 184 on the top surface 182 of the training feature 152 using the laparoscopic instruments 110 and a suture 196 (see FIGS. 16 and 17) to perform a continuous stitch (also referred to as a running stitch). A continuous stitch is a series of stitches completed to affix edges of a wound to close the wound.

As shown, the simulated tissue 185 includes a pair of adjacently positioned edges 198 that simulate the edges of a wound 201 (shown in FIGS. 16 and 17). The edges 198 may include indicia 199 such as dots and the like to indicate the desired location of a singular stitch to be performed by the trainee during the training exercise. In some examples, the simulated tissue 185 can include an attachment feature 200 that is configured to mate with the attachment feature 184 positioned on the top surface 182 of the training feature 152. The attachment feature 200 reduces movement of the simulated tissue 185 with respect the platform during the training exercise.

Figure 15:
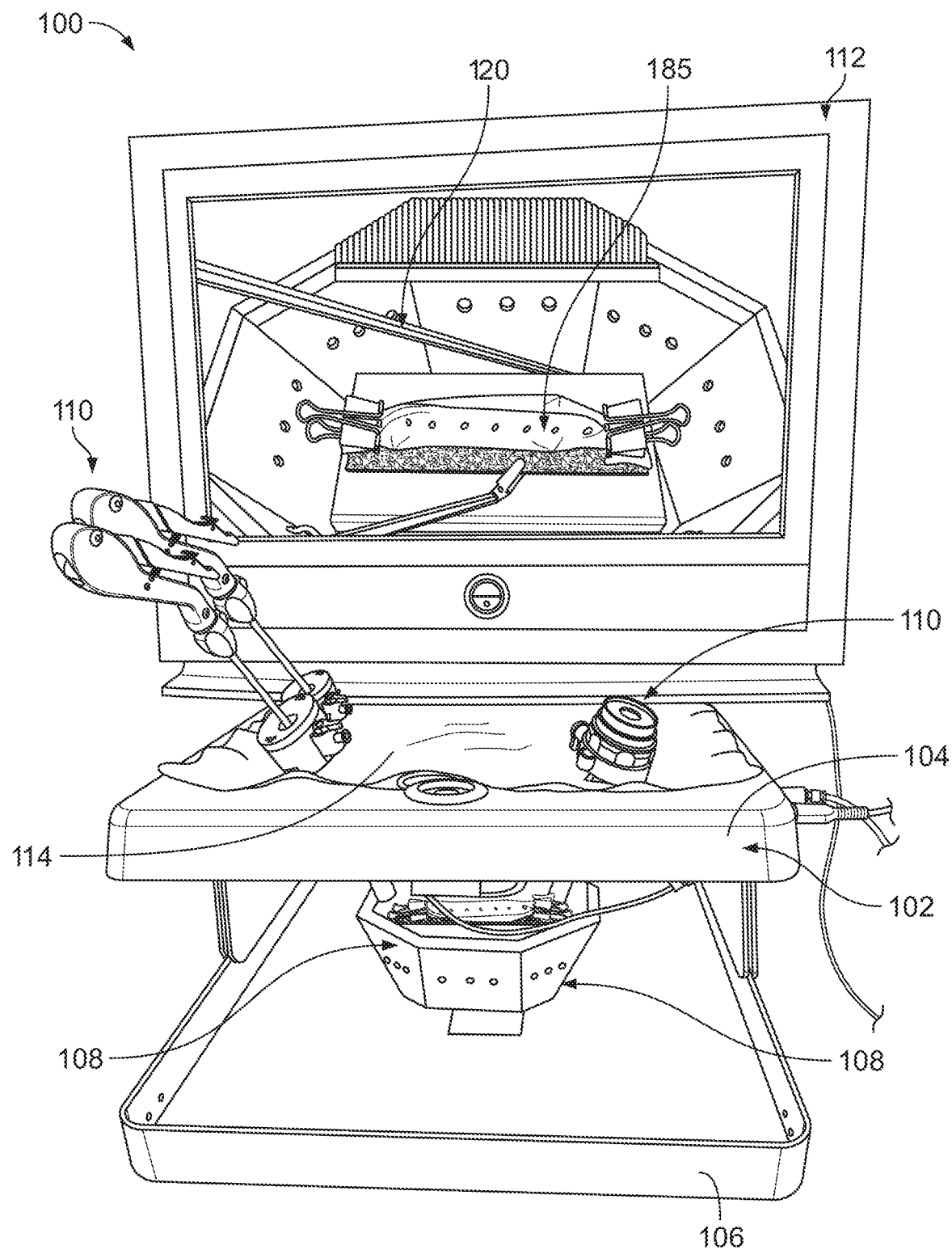
FIG. 15 illustrates another perspective view of the training system of FIG. 1 including the training device of FIG. 2 during a stitching training exercise.

FIG. 15 shows the training system 100 during the stitching training exercise of FIG. 14. Like the examples described above, the display 112 depicts an image captured by the endoscope 120. During the training exercise, the trainee is instructed to manipulate the simulated tissue 185 with the laparoscopic instruments 110, specifically graspers, and perform the stitching exercise.

FIGS. 16 and 17 show laparoscopic instruments 110 being used to manipulate the suture 196 on the simulated tissue 185. Specifically, the trainee will guide the suture 196 into the edges 198 of the simulated tissue 185 at each indicia 199 along the length of the simulated tissue 185. As the trainee progresses along the length of the simulated tissue 185, if performed correctly, the edges 198 will mate and the wound 201 will become closed at the end of the exercise.

A variety of other training exercises can be performed in connection with the training device 108 disclosed herein. For example, a variety of other stitching exercises can be performed with a variety of training elements 155 using a variety of differently simulated tissues having different sizes and shapes. For example, the training element 155 shown in FIGS. 12-17 can be secured to other portions of the training device 108 such as to the training features 152 on the walls 124. Such an example would allow the trainee to perform a stitching exercise in a simulated environment on a non-level surface, further testing the trainee's ability of manipulate the laparoscopic instruments 110 effectively. Additionally, in some examples, a wedge element having a wedge shape (like that of a door stop) may be used to tilt the training device to simulate a gynecological surgery environment having a non-level surface. Further, a variety of other manual dexterity exercises using a variety of different training elements 155 may also be performed within the interior volume 128 of the training device 108.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A training device comprising:
   a base forming a working surface;
   a plurality of walls surrounding the base and defining an interior volume, each wall of the plurality of walls having a bottom side, a top side, an interior face, and an exterior face, each wall of the plurality of walls being connected to an outer edge of the base at the bottom side and being connected to a lip at the top side, each interior face facing in a direction toward the interior volume, and each exterior face facing in a direction away from the interior volume, wherein each wall of the plurality of walls being angled away from the base as each wall extends toward the lip providing the interior volume with a shape simulating a gynecological surgery environment; and
   a training feature attached to at least one of the plurality of walls or the base, the training feature including a platform having at least one training element, and the training feature being removable and interchangeable with at least one other training feature, wherein the training feature includes a channel disposed along a periphery of the training feature, and the channel is configured to receive an edge disposed inside a port of at least one wall of the plurality of walls to retain the training feature within the port of the at least one wall.

2. The training device of claim 1, wherein the training feature has one or more apertures, wherein the one or more apertures are sized and shaped to hold the at least one training element, and wherein the at least one training element has a peg shape.

3. The training device of claim 1, wherein the training feature is attached to at least one of the plurality of walls or the base using an attachment feature.

4. The training device of claim 1, wherein the lip has a surface angled with respect to the plurality of walls and parallel with the working surface of the base, wherein the surface of the lip includes an attachment feature.

5. The training device of claim 4, wherein the attachment feature of the lip is a hook and loop fastener.

6. The training device of claim 1, wherein an attachment feature is disposed on a bottom surface of the base, the bottom surface being opposite of the working surface, and the attachment feature is configured to attach the training device to a working base of a platform.

7. The training device of claim 1, wherein at least one wall of the plurality of walls includes an attachment feature at a side that faces away from the working surface.

8. The training device of claim 1, wherein at least one wall of the plurality of walls includes indicia disposed on a side that faces the interior volume, the indicia configured to identify the at least one wall during a training exercise.

9. The training device of claim 1, wherein the training feature is insertable inside the port from the exterior face of the at least one wall.

10. A method of training for gynecological surgery comprising:
    providing a laparoscopic training device having a concave structure having a base and a plurality of walls extending away from the base, the base and the plurality of walls defining an interior volume, each wall of the plurality of walls having a bottom side, a top side, an interior face, and an exterior face, each wall of the plurality of walls being connected to an outer edge of the base at the bottom side and being connected to a lip at the top side, each interior face facing in a direction toward the interior volume, and each exterior face facing in a direction away from the interior volume, wherein each wall of the plurality of walls being angled away from the base as each wall extends toward the lip providing the interior volume with a shape simulating a gynecological surgery environment, wherein the interior volume includes a training feature removably attached to at least one of the plurality of walls or the base, the training feature including a platform having a training element that includes a plurality of pegs positioned therein, wherein the training feature includes a channel disposed along a periphery;
    providing instructions to transfer a ring between at least two pegs of the plurality of pegs using a laparoscopic instrument; and
    providing instructions to replace the training feature with at least one other training feature having a different training element by dislodging an edge disposed inside a port of at least one wall of the plurality of walls from the channel of the training feature to remove the training feature from the port of the at least one wall.

11. The method of claim 10, further comprising:
    providing instructions to transfer the ring between at least two pegs of the plurality of pegs coupled to different walls of the plurality of walls, or between at least two pegs of the plurality of pegs coupled to the base and a wall of the plurality of walls.

12. The method of claim 11 further comprising: providing instructions to transfer the ring between at least two pegs of the plurality of pegs coupled to a single wall of the plurality of walls or between at least two pegs of the plurality of pegs coupled to the base.

13. A method of training for surgery comprising:
providing a laparoscopic training device having a concave structure having a base and a plurality of walls extending away from the base, the base and the plurality of walls defining an interior volume, each wall of the plurality of walls having a bottom side, a top side, an interior face, and an exterior face, each wall of the plurality of walls being connected to an outer edge of the base at the bottom side and being connected to a lip at the top side, each interior face facing in a direction toward the interior volume, and each exterior face facing in a direction away from the interior volume, wherein each wall of the plurality of walls being angled away from the base as each wall extends toward the lip providing the interior volume with a shape simulating a gynecological surgery environment, wherein the interior volume includes an attachment feature, and a training feature having at least one training element positioned thereon and a channel disposed along a periphery;
providing laparoscopic instruments;
providing instructions to perform a training exercise on the training element using the laparoscopic instruments; and
providing instructions to replace the training feature with at least one other training feature having a different training element by dislodging an edge disposed inside a port of at least one wall of the plurality of walls from the channel of the training feature to remove the training feature from the port of the at least one wall.

14. The method of claim 13, wherein the training exercise is a laparoscopic stitching exercise or a cutting exercise.

15. The method of claim 14, wherein the training element is a simulated tissue, and the stitching exercise includes completing at least one of a simulated intracorporeal suture, extracorporeal suture, and continuous stitch on simulated tissue.

16. The method of claim 13, wherein the attachment feature is positioned on at least one of the plurality of walls or the base.

17. The method of claim 13 further comprising:
providing an additional attachment feature on the lip disposed on a top of the plurality of walls, opposite of the base, wherein an additional training element is removably coupled to the additional attachment feature; and
providing instructions to perform an additional training exercise on the additional training element coupled to the additional attachment feature using the laparoscopic instruments.

* * * * *